United States Patent
Starnes

(10) Patent No.: US 11,866,223 B2
(45) Date of Patent: Jan. 9, 2024

(54) TRAYS

(71) Applicant: ALTO PACKAGING LIMITED, Auckland (NZ)

(72) Inventor: Ronald George Starnes, Auckland (NZ)

(73) Assignee: ALTO PACKAGING LIMITED, Auckland (NZ)

( * ) Notice: Subject to any disclaimer, the term of this patent is extended or adjusted under 35 U.S.C. 154(b) by 865 days.

(21) Appl. No.: 16/486,552

(22) PCT Filed: Feb. 16, 2018

(86) PCT No.: PCT/IB2018/050949
§ 371 (c)(1),
(2) Date: Aug. 16, 2019

(87) PCT Pub. No.: WO2018/150361
PCT Pub. Date: Aug. 23, 2018

(65) Prior Publication Data
US 2020/0002047 A1     Jan. 2, 2020

(30) Foreign Application Priority Data
Feb. 16, 2017   (NZ) .......................... 729178

(51) Int. Cl.
| | | |
|---|---|---|
| *B65D 1/34* | (2006.01) |
| *B26F 1/38* | (2006.01) |
| *B29C 51/32* | (2006.01) |
| *B65D 75/00* | (2006.01) |
| *B29L 31/00* | (2006.01) |

(52) U.S. Cl.
CPC ................. *B65D 1/34* (2013.01); *B26F 1/38* (2013.01); *B29C 51/32* (2013.01); *B65D 75/006* (2013.01); *B29C 2793/009* (2013.01); *B29L 2031/712* (2013.01)

(58) Field of Classification Search
CPC ....... B29C 51/32; B29C 51/26; B29C 51/445; B29C 2793/009; B65D 1/34; B65D 75/006; B26F 1/38; B29L 2031/712; B29L 2031/7162
See application file for complete search history.

(56) References Cited

U.S. PATENT DOCUMENTS

| | | |
|---|---|---|
| 3,185,371 A | 5/1965 | Reifers |
| 3,357,053 A * | 12/1967 | Lyon ...................... B29C 51/04 264/294 |
| 3,917,788 A | 11/1975 | Padovani |
| 4,889,231 A | 12/1989 | Foote et al. |
| 2002/0179607 A1 | 12/2002 | Iwasaki et al. |

FOREIGN PATENT DOCUMENTS

| | | | |
|---|---|---|---|
| EP | 0380250 A2 | 8/1990 | |
| WO | 2012064203 A1 | 5/2012 | |
| WO | WO2012/064203 * | 5/2012 | ......... B29C 67/0044 |
| WO | 2013103884 A1 | 7/2013 | |

* cited by examiner

*Primary Examiner* — Monica A Huson
(74) *Attorney, Agent, or Firm* — DANN, DORFMAN, HERRELL and SKILLMAN, P.C.

(57) ABSTRACT

An improved open mouthed container having a profiled upper periphery about the mouth, and comprising a base, and a peripheral sidewall extending generally upwards from the base, wherein the profiled upper periphery comprises a rim region, and the rim region extending outwardly and downwardly from the peripheral sidewall of the improved open mouthed container.

10 Claims, 4 Drawing Sheets

TRAYS

FIELD OF THE INVENTION

The present invention relates to trays, and/or methods of manufacturing trays. More particularly, but not exclusively, it relates to an improved rolled rim tray suitable for use with overwrapped film, and/or associated methods of manufacturing.

BACKGROUND OF THE INVENTION

Perishable goods such as meat, poultry, fish, fruit or vegetable are often sealed by transparent plastic film in trays to be displayed for inspection by customers. It is known that trays may be sealed using plastic film to protect the tray's contents while presenting an appealing aesthetic.

Trays with overwrapping offer an inexpensive packaging solution suitable for both automatic and manual wrapping applications. Typically, a tray is overwrapped with a plastic film that is stretched around the tray and adheres to itself where the overwrap film overlaps (usually under the base of the tray). When using this type of packaging, reduction of leaks becomes an important consideration, because if leaks occur, it can present a food safety hazard and/or lose customer appeal.

Failure to create an adequate seal may lead to contamination and/or food spoilage, because micro-organisms thrive in liquids derived from perishable goods like meat, and can also produce unpleasant odours. Accordingly, failure to seal adequately may detrimentally affect the quality, colour and/or taste of the meat (or produce). Further, exudate from meat is visually unappealing, and unappetising to consumer. Accordingly, it is preferred that exudate be minimised and/or contained within the tray.

One known solution to reduce leakage from produce trays is to heat seal plastic film onto the upper rim of the tray, thus creating a hermetic seal. However, such top sealing processes, require material and machinery that is comparatively much more costly than an overwrap film solution.

It is an object of the present inventions to provide an improved tray that overcomes or at least partially ameliorates one or more of the abovementioned disadvantages, or that at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

For the purpose of this specification, where method steps are described in sequence, the sequence does not necessarily mean that the steps are to be chronologically ordered in that sequence, unless there is no other logical manner of interpreting the sequence.

SUMMARY OF THE INVENTION

According to a first aspect the invention broadly comprises an open mouthed container having a profiled upper periphery about the mouth comprising:
  a base,
  a peripheral sidewall extending generally upwards from said base,
  wherein said profiled upper periphery comprises a rim region extending outwardly and downwardly from said peripheral sidewall, and a rolled rim region extending from an outer edge of said rim region and rolling inwardly towards said peripheral sidewall, and terminating at a cut edge.

According to a further aspect said cut edge is located inboard of an outermost extent of said rolled rim region.

According to a further aspect said container is overwrapped by a plastics film that is stretched around said container to close a said open mouth, and overlaps itself, and clings to itself.

According to a further aspect said rim region is substantially planar in cross-section.

According to a further aspect said rim region is not concave upwardly in cross section.

According to a further aspect said rim region extends downwardly at approximately between 20° and 70° from horizontal.

According to a further aspect said rim region extends downwardly at approximately between 30° and 45° from horizontal.

According to a further aspect said rim region extends downwardly at approximately 30° from horizontal.

According to a further aspect said rim region extends downwardly at approximately 45° from horizontal.

According to another aspect the invention broadly comprises an open mouthed container having a profiled upper periphery about the mouth comprising:
  a base,
  a peripheral sidewall extending generally upwards from said base,
  wherein said profiled upper periphery comprises:
    a rim region extending outwardly and downwardly from said peripheral sidewall, and
    a rolled rim region extending from an outer edge of said rim region and rolling inwardly towards said peripheral sidewall, and
    a counter roll region extending from an edge of said rolled rim, and extending outwardly away from said peripheral sidewall, and defining a cutting zone, and
  wherein said container is trimmed from a thermoformed preform, while said pre-form is in a stretched state, and
  wherein in said stretched state, said trimming occurs at said cutting zone and said cutting zone is presented substantially perpendicular to a trimming direction, thereby forming a perpendicular cut edge when cut.

According to a further aspect said cut edge is located inboard of an outermost extent of said rolled rim region, when said container is in a relaxed state.

According to a further aspect said rim region extends outwardly and downwardly from said peripheral sidewall.

According to a further aspect in cross section, said cutting zone is substantially parallel to said rim region.

According to a further aspect the open mouther container further comprising a plastic cling film overwrap.

According to a further aspect the invention broadly comprises a method of forming a container according to any one of the previous clauses.

According to a further aspect the invention broadly comprises a method of forming an open mouthed container including a profiled upper periphery about the mouth comprising:
  stretching a preform of said container including said profiled upper periphery outwardly to deform said profile until a cut zone is presented perpendicular to a trimming cut locus, trimming said preform along said cut locus,
allowing the trimmed container to relax and re-form said profiled upper periphery.

According to a further aspect said trimming occurs at an outermost location of said container, and forms a cut perimeter, and
wherein in a relaxed and trimmed state, said cut perimeter is not at an outermost periphery of said container.

According to a further aspect in said stretched state, said rolled rim is at least for the most part, unfurled.

According to a further aspect wherein said trimming is by a punch and die set acting in a trimming direction.

According to a further aspect said trimming direction is substantially vertical.

According to a further aspect said trimming direction is transverse to the container material in the cutting zone.

According to a further aspect said cutting zone is presented substantially horizontal.

According to a further aspect the invention broadly comprises a container substantially as herein described with reference to any one or more of FIGS. 3 to 4.

According to a further aspect the invention broadly comprises a container substantially as herein described with reference to any one or more of FIGS. 5a to 5b.

According to a further aspect the invention broadly comprises a container substantially as herein described with reference to any one or more of FIGS. 6a to 6b.

According to a further aspect the invention broadly comprises a method of forming a container substantially as herein described with reference to any one or more of FIGS. 3 to 4.

According to a further aspect the invention broadly comprises a method of forming a container substantially as herein described with reference to any one or more of FIGS. 5a to 5b.

According to a further aspect the invention broadly comprises a method of forming a container substantially as herein described with reference to any one or more of FIGS. 6a to 6b.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

BRIEF DESCRIPTION OF THE DRAWINGS

The invention will now be described by way of example only and with reference to the drawings in which.

DETAILED DESCRIPTION OF PREFERRED EMBODIMENTS

Overwrapped trays comprising plastic film stretched and wrapped around a tray, results in a tight package with aesthetic appeal for customers. As the overwrapped film wraps around the tray and comes back into contact with itself, the overlapping film surfaces cling together to maintain tension in the stretched film membrane that seals the open topped tray. The plastic film wrap may be applied manually, or by automatic stretch wrapping machines, as is generally known in the industry.

Stretch wrapped packaged trays are relatively cheaper in comparison to their top-seal tray counterparts e.g. modified atmosphere packaging (MAP). Top-sealed trays are usually more expensive due to the cost of machinery, gases filling, and specific film material for adhesion and hermetic sealing.

However, a known disadvantage with traditional stretch wrapped packaged trays are their tendency to leak. The most common leak path is past the region where the film contacts the rim of the tray.

Figure 1:
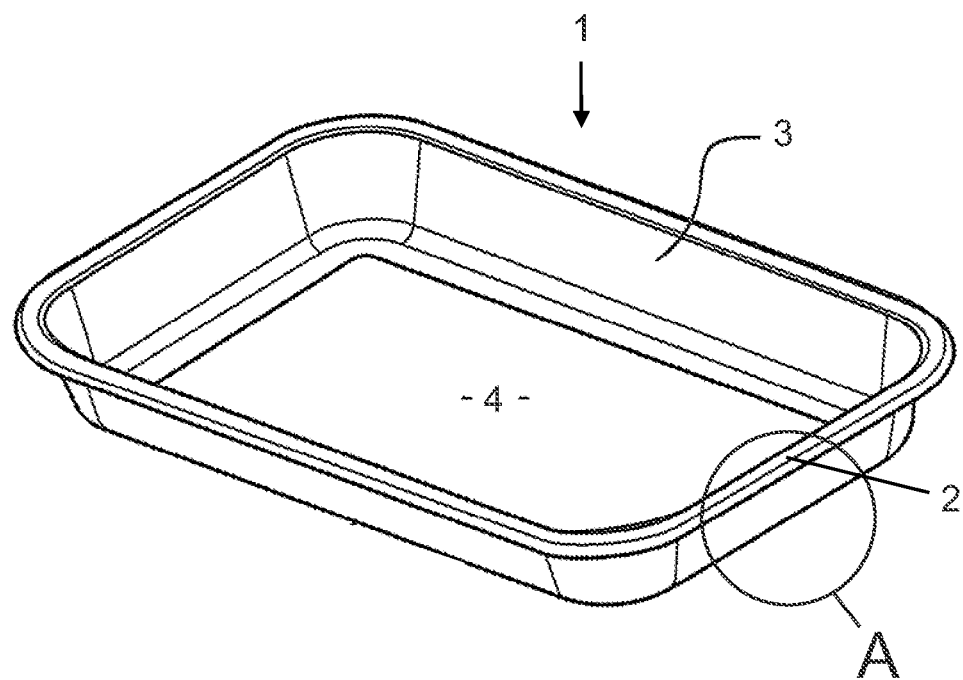
FIG. 1 is a perspective view of a typical rolled rim prior art tray.

To reduce the likelihood of the overwrapped film 6 from being cut or punctured when it is in contact with a tray 1, rolled edge trays 1 as shown in FIG. 1 (prior art), are often used in combination with stretch wrapped packaging. The rolled rim region 2 of the tray provides a smooth surface for overwrapped film 6 to come into contact with.

To form rolled edged trays 1, a thermoforming technique is typically used. In a thermoforming process, a plastic sheet is first heated into a pliable form. Subsequently, a mould deforms the sheet into a specific shape, such as a rolled rimmed tray 1, illustrated in FIG. 1. Finally, a trimming process (e.g. a mechanical punch and die set) cuts or punches out the final product form from the sheet, leaving scrap plastic. The scrap may subsequently be recycled. However, as punch and die sets are necessary in a thermoforming process and are expensive to maintain and replace, it is preferable to reduce wear and blunting to extend their lifetime.

According to various aspects of the various embodiments of the present inventions as illustrated by the examples in FIGS. 3-6, there is provided a number of improvements to trays suitable for plastics film overwrapping, which will now be described. It will be appreciated that each of these improvements may be applied to a tray alone, or in combination, to achieve different product configurations.

An example rectangular tray 1 is shown in FIG. 1, comprising a base 4, a surrounding peripheral side wall 3, defining an open mouth 5. At the upper extent of the side wall 3 is a rim region 2, provided by a horizontal rim 7, and outward of rim 7, a rolled rim region 8. An overwrapped film 6, with a wrap path as depicted in FIG. 2, is stretched and wrapped around the tray 1.

Accordingly, a seal is formed between the rim 7 (and rolled rim 2), and the film 6. It will be appreciated that the seal is not a complete hermetic seal, but that the tension in the film 6, tends to pull the film surface into close contact with the rim 7, and rolled rim 8. This interaction between the film 6 and the rim region of the tray, provides an effective seal around the perimeter of the tray, that is capable of at least resisting inflow of exudate or other contaminants.

Figure 2:
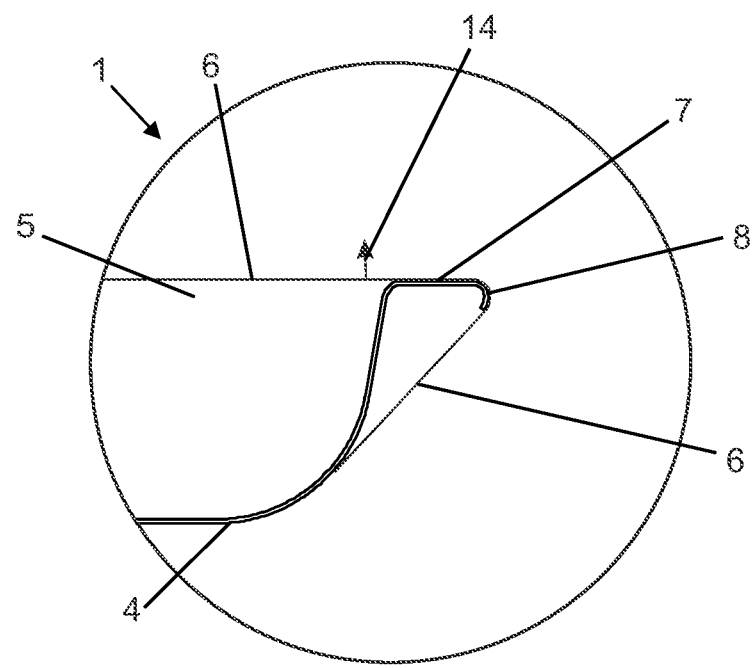
FIG. 2 is a close-up view of region A of FIG. 1.

However, as shown in FIG. 2, in the region of the film 6, adjacent the rim 7, any out of plane movement (as indicated by arrow 14), tends to lift film 6 away from contacting the rim 7. Accordingly, even relatively small deviations from the horizontal plane cause lift in the overwrapped film 6, and break the effective seal. Such out of plane movement of the film 6 can be commonly caused during transit or by retailers and/or customers handling the wrapped trays for example.

The disruption of the effective seal, can lead to an increased risk of leaks, and/or increased risk of exudate getting between the film 6 and rim 7, which can look very unappealing, and is generally undesirable.

Figure 3:
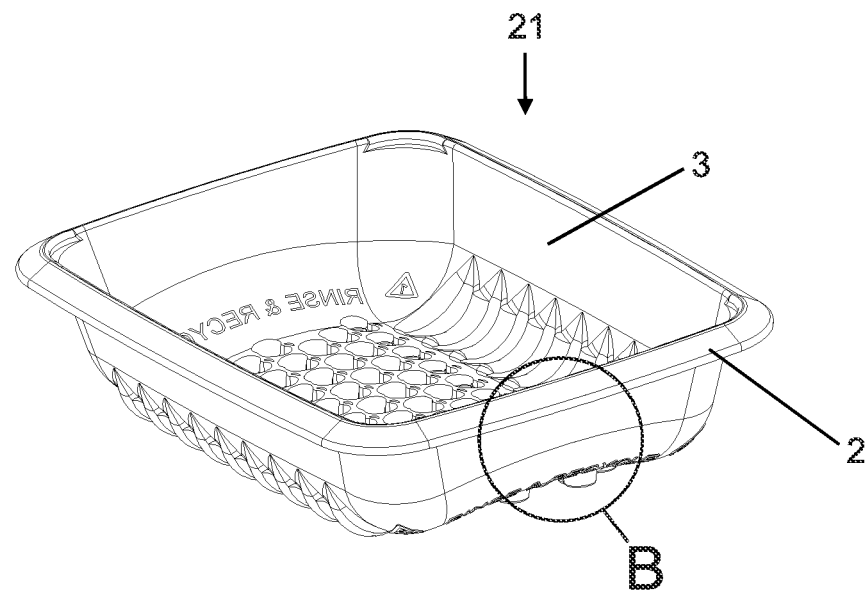
FIG. 3 is a perspective view of an improved rolled rim tray.
Figure 4:
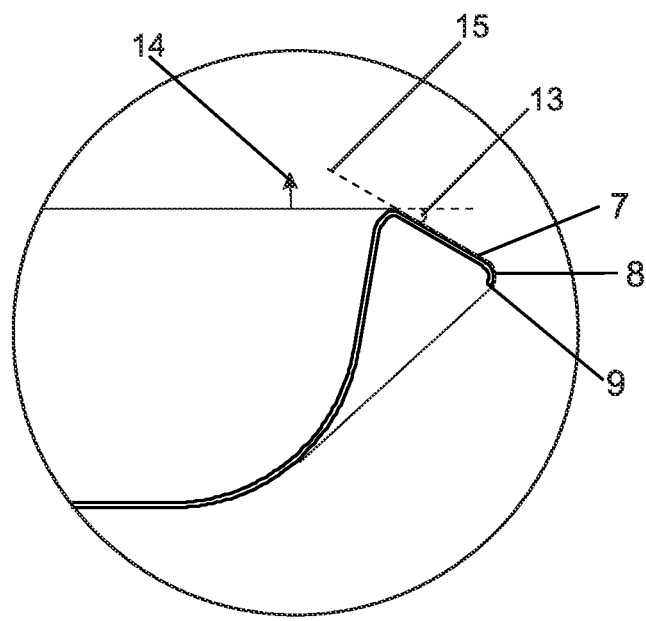
FIG. 4 is a close-up view of region B of FIG. 3.

With reference to FIGS. 3-4, one preferred feature of the present invention will be described. Tray 21 in its finished form is shown in FIG. 3, and it will be appreciated that the tray 21 may be in the form of other shapes, for example, square, triangular, round, etc.

The peripheral side wall 3 at its upper extent has a rim region 2 comprising an outwardly extending rim 7, leading to a rolled rim 8, and terminating at a cut edge 9. However, it will be appreciated that in some alternative configurations, the rolled rim 8 may not be present, and the rim 7 may terminate directly at cut edge 9

The improved tray is configured so that the substantially planar portion of the outwardly extending rim 7, forms an acute angle 13 from the horizontal plane. In its preferred embodiment, the outwardly extending rim 7, also extends downwards from the upper extent of the peripheral side wall 3. It is preferred that the rim 7, is wide enough to present an adequate surface for the film 6 to contact, and form an effective seal.

It has been found that this feature of present invention can improve the trays leak resistance. In contrast with the prior art tray (as shown in FIG. 2), the improved tray 21 requires a greater out of plane deviation from the horizontal (shown by arrow 14), to lift the overwrapped film 6 out of contact with the outwardly (and downwardly) extending rim 7. With the improved angled rim 7, the overwrapped film 6 needs to deviate past the dashed 15, in order to lift the film away from a tight contacting relationship with the outwardly extending rim 7.

Accordingly, the present invention is less susceptible to leak risks, initiated by movement of the film 6, for example during handling of the overwrapped tray 21.

Preferably, the acute angle 13 is approximately between 20° and 70°, from horizontal.

More preferably still, the acute angle 13 is approximately between 30° and 45°.

Preferably, the rim 7 is substantially flat, and/or not concave upwardly.

The tray 21, may comprise of materials used in our PLIX™ range of containers, trays and the like. Examples of materials include, by way of example, unfoamed PET, PLA, CPET, PP and high impact polystyrene. Further, there are many foamed materials that may also be employed in the tray 21. The overwrapped film 6, may be PVC for example. However, it will be appreciated that any suitable materials for the tray 21 and/or film 6, may benefit from this improvement.

The rolled rim region 8 is preferably arranged so that the tray 1 may be wrapped by an overwrapped film 6, in a way that the wrap path is less likely to encounter the cut edge 9, in order to reduce the likelihood of a puncture occurring if the cut edge 9 is sharp.

It is preferable that the cut edge 9, is faced away from the pathway of the overwrapped film 6. Accordingly there is a reduced risk of any sharp edges from the cut edge 9 tearing the overwrapped film 6.

In most preferred embodiments, the cut edge 9 is preferably located sufficiently inward of the overwrapped film 6, such that there is a reduced tendency for contact between the cut edge 9 and the overwrapped film 6.

Figure 5A:
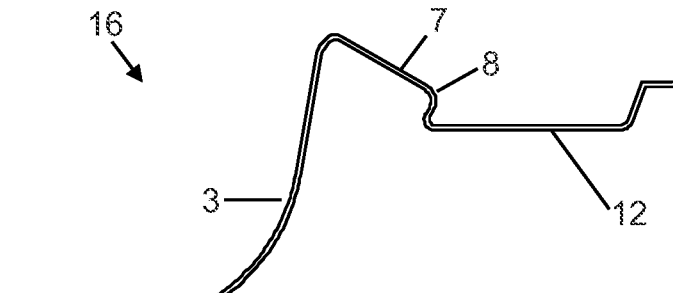
FIG. 5a is a partial cross section of the peripheral side wall and rolled rim region of an untrimmed tray similar to the tray of FIG. 3.
Figure 5B:
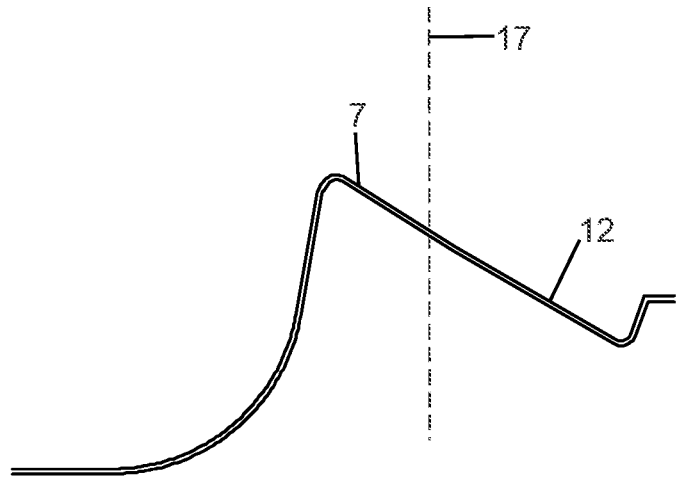
FIG. 5b is a partial cross section of the peripheral side wall and rolled rim region of a tray similar to the tray of FIG. 3, shown in a stretched state immediately before trimming.

A preferred method of reducing the risk of cut edge 9, damaging the film 6, will be described with particular reference to FIG. 5a-5c. FIG. 5a illustrates an untrimmed pre-form 16 of tray 21. The untrimmed preform 16 includes the sidewall 3, outwardly (and downwardly) extending rim 7, and an excess portion 12. It will be appreciated that when the excess portion 12 is trimmed off, the final form of the tray 21 is left.

In order to trim the tray, a co-operating die and punch set can be employed (not shown). In the most preferred method, the punching process first stretches the outer rim of the untrimmed tray as shown in FIG. 5b. The rolled rim 8 is preferably at least somewhat straightened out by the stretching process, such that the portion to be cut (illustrated by cutting line 17) is no longer located under the outer periphery of the rolled rim 8. Thus the stretching process makes it easier to trim the tray, by providing improved access to the cut zone.

Figure 5C:
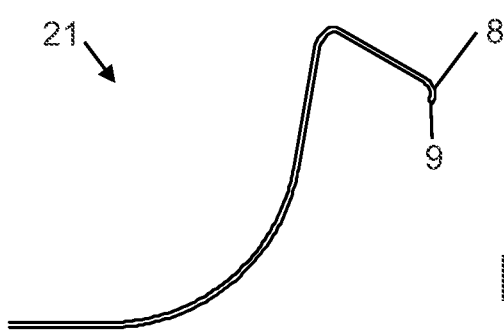
FIG. 5c is a partial cross section of the peripheral side wall and rolled rim region of a tray similar to the tray of FIG. 3, shown in a relaxed state after trimming.

In addition, after the cut is complete, the tray 21 can relax into an un-stretched state as illustrated in FIG. 5c. The relaxing of the tray reforms the rolled rim 8, and the cut edge 9 can spring back to an orientation and/or position that minimises the cut edge 9 from puncturing an overwrapped film. That is, the cut edge 9 can face slightly inwards towards the tray sidewall 3, and/or may be located in board of the outermost extent of rolled rim 8.

It has been found that this improvement to trays suitable for overwrap packaging, operates well. However, a problem encountered when forming trays as illustrated, is the relatively rapid wear and blunting of the punch and die sets used to trim the trays. This issue arises due to the oblique angle at which the tray material is presented relative to the cut locus along which co-operating die and punch operates. That is, the cut locus (illustrated by line 17) is preferably vertical, and the tray material is presented at an angle that is not substantially perpendicular to the cut locus.

Figure 6A:
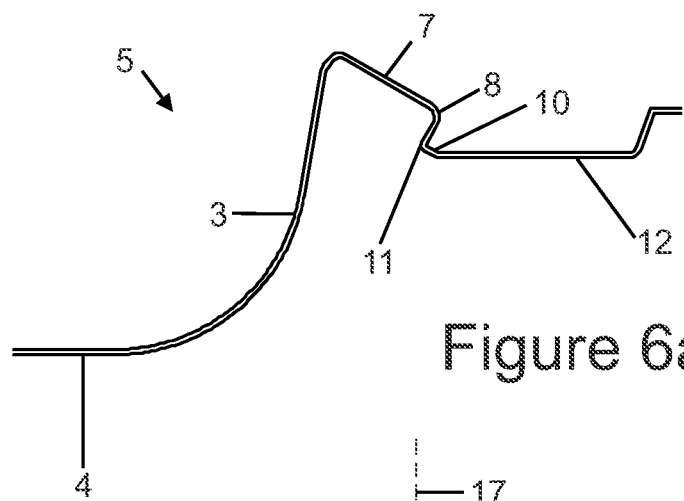
FIG. 6a is a partial cross section of the peripheral side wall and rolled rim region of an improved and untrimmed tray.

A further improved configuration will now be described with reference to FIGS. 6a to 6. FIG. 6a shows a preform of the untrimmed tray 1, comprising a rim region 7, a peripheral side wall 3, a base 4, and an open mouth 5. The rim 7 at its outer extent comprises a rolled rim 8 (curling towards the container sidewall 3), that blends into a counter roll 11 (that curls away from the container sidewall 3), before the of cut region 12 extends substantially horizontally. In particular, a cutting zone 10, is located between the counter roll 11, and the of cut region 12. The cutting zone 10 is preferably substantially parallel to the plane of the rim 7.

Figure 6B:
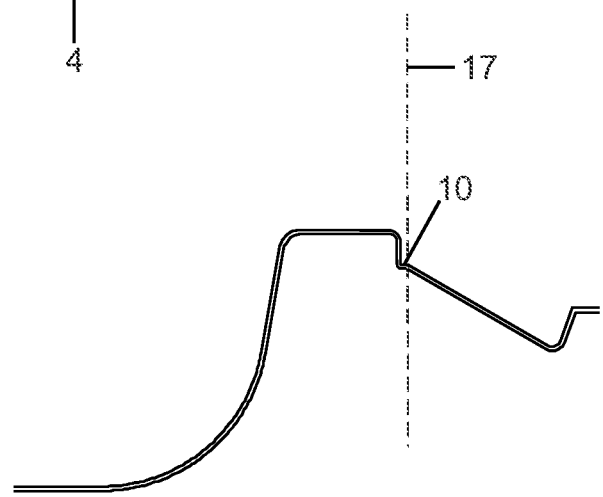
FIG. 6b is a partial cross section of the peripheral side wall and rolled rim region of the tray of FIG. 6a, shown in a stretched state immediately before trimming.

FIG. 6b shows the outwardly stretched form of the untrimmed tray 21. The stretched form of the untrimmed tray presents the cutting zone 10, to the cut-line 17, such that the cut locus is substantially transverse through the material in the cut zone 10. The cut-line 17, is the path travelled by the punch and die sets used to trim off the of cut region 12, of the preform tray 1. Accordingly, the operating surfaces of the punch and die are not exposed to significant lateral pressure is which hasten blunting.

It will be appreciated that the geometry and shape of the preformed tray may influence the geometry and shape of the cutting zone 10. The objective of the cutting zone 10, is that it be presented substantially perpendicular to the cut locus, and outboard of the rim region, when the tray is in its stretched state.

The punch and die sets used in a thermoforming process wear out and blunt over time and are expensive to replace. It is thus preferable to prevent or minimise lateral forces on the punch and die to extend the lifetime of these tools. The lifetime of the punch and die sets may be extended, if the cutting 10 is substantially transverse to the cut-line II-II, thus minimising the lateral forces on the tools.

Figures 6C, 6D:
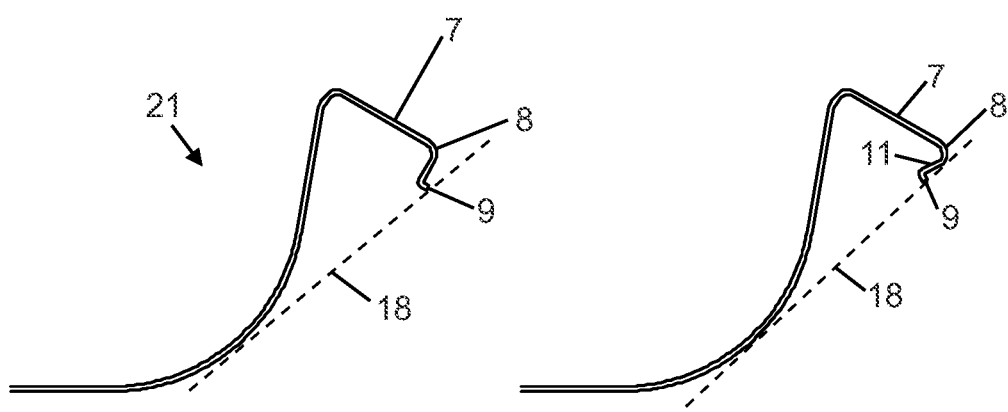
FIG. 6c is a partial cross section of the peripheral side wall and rolled rim region of the tray of FIG. 6a, shown in a relaxed state after trimming.
FIG. 6d is a partial cross section of the peripheral side wall and rolled rim region of a further improved tray, shown in a relaxed state after trimming.

FIG. 6c shows a final form of a trimmed tray 21, after it has relaxed from its stretched state. After the tray 21 has been trimmed, the rolled rim region 2 terminates at its cut edge face 9, leaving a leftover piece 12 (not shown in FIG. 6c) which may be recycled or discarded.

Preferably the cut edge 9 is close to the counter-roll region 11, to minimise the distance the cut edge 9 extends outward, in order to reduce the likelihood of this cut face 9 interfering with the film pathway (shown by broken line 18).

It is preferable that the cut edge 9, is faced away from the pathway of the overwrapped film 6. Accordingly there is a reduced risk of any sharp edges from the cut edge 9 tearing the overwrapped film 6.

With reference to FIG. 6d, an alternative form of tray 21 is shown. In this for consideration, the rolled rim 8, and counter roll 11, such that the cut edge 9 is located slightly on board the expected overwrap film path (shown by broken line 18).

To those skilled in the art to which the invention relates, many changes in construction and widely differing embodiments and applications of the invention will suggest themselves without departing from the scope of the invention as defined in the appended claims.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention claimed is:

1. A thermoformed open mouthed container for perishable goods having a profiled upper periphery about the mouth, said container comprising:
    a base,
    a peripheral sidewall extending generally upwards from said base,
    wherein said profiled upper periphery comprises a rim region substantially straight in cross section and extending obliquely outwardly and downwardly from said peripheral sidewall, and a rolled rim region extending from an outer edge of said rim region and rolling inwardly towards said peripheral sidewall, and terminating at a cut edge formed when said container is cut from a thermoformed plastic sheet, and
    wherein said cut edge is located inboard of an outermost extent of said rolled rim region.

2. An open mouthed container as claimed in claim 1, wherein said container is overwrapped by a plastics film that is stretched around said container to close a said open mouth, and overlaps itself, and clings to itself.

3. An open mouthed container as claimed in claim 1, wherein said rim region is not concave upwardly in cross section.

4. An open mouthed container as claimed in claim 1, wherein said rim region extends downwardly at approximately between 20° and 70° from horizontal.

5. An open mouthed container as claimed in claim 4, wherein said rim region extends downwardly at approximately between 30° and 45° from horizontal.

6. An open mouthed container as claimed in claim 5, wherein said rim region extends downwardly at approximately 30° from horizontal.

7. An open mouthed container as claimed in claim 5, wherein said rim region extends downwardly at approximately 45° from horizontal.

8. A thermoformed open mouthed container for perishable goods having a profiled upper periphery about the mouth comprising:
    a base,
    a peripheral sidewall extending generally upwards from said base,
    wherein said profiled upper periphery comprises:
        a rim region substantially straight in cross section and extending outwardly and downwardly from said peripheral sidewall, and
        a rolled rim region extending from an outer edge of said rim region and rolling inwardly towards said peripheral sidewall, and
        a counter roll region extending from an edge of said rolled rim, and extending outwardly away from said peripheral sidewall, and defining a cutting zone, and
    wherein said container is trimmed from a thermoformed preform, while said pre-form is in a stretched state, and
    wherein in said stretched state, said trimming occurs at said cutting zone and said cutting zone is presented substantially perpendicular to a trimming direction, thereby forming a perpendicular cut edge when cut, and
    wherein said cut edge is located inboard of an outermost extent of said rolled rim region when said container is in a relaxed state.

9. An open mouthed container as claimed in claim 8, further comprising a plastic cling film overwrap.

10. An open mouthed container as claimed in claim 9, wherein said overwrap is stretched over the profiled periphery of said open mouthed container, and overlaps with itself and said cut edge is out of contact with said overwrap.

* * * * *